T. J. STANKIEWICZ.
AUTOMATIC FIRE EXTINGUISHER SYSTEM.
APPLICATION FILED OCT. 31, 1908.
971,089.
Patented Sept. 27, 1910.
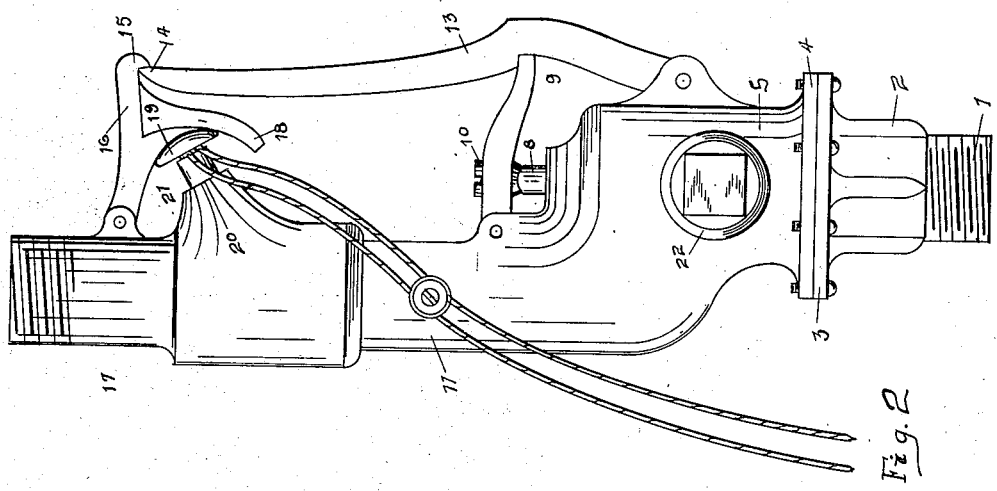
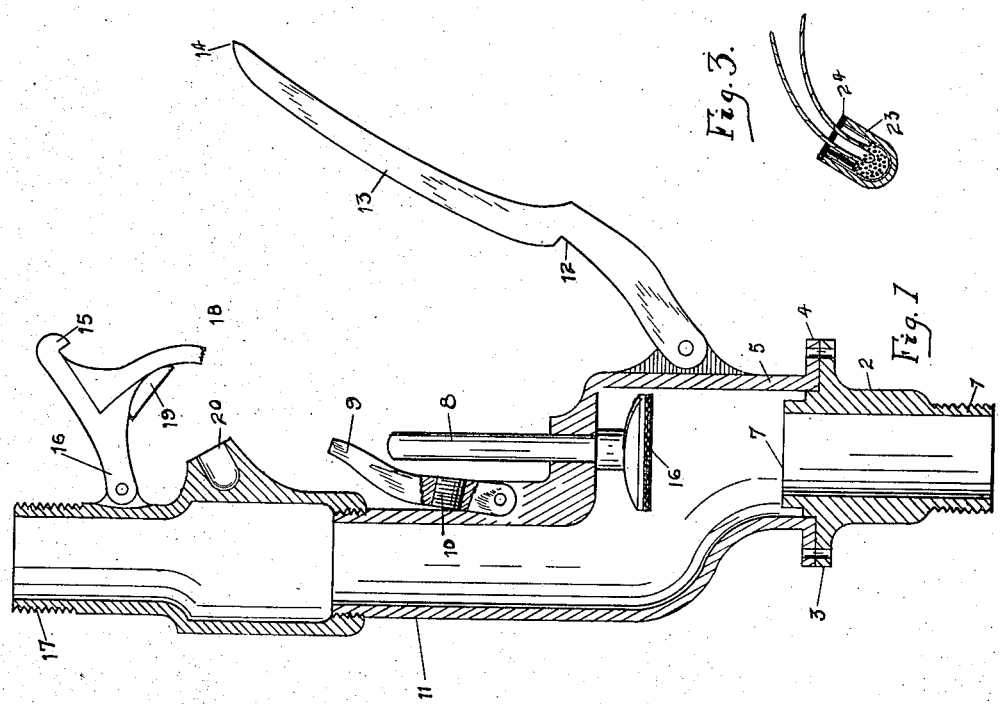

UNITED STATES PATENT OFFICE.

TADIUS J. STANKIEWICZ, OF CHICAGO HEIGHTS, ILLINOIS.

AUTOMATIC FIRE-EXTINGUISHER SYSTEM.

971,089.　　　　　　　Specification of Letters Patent.　　Patented Sept. 27, 1910.

Application filed October 31, 1908. Serial No. 460,534.

*To all whom it may concern:*

Be it known that I, TADIUS J. STANKIEWICZ, a citizen of the United States, and a resident of Chicago Heights, county of Cook, and State of Illinois, have invented certain new and useful Improvements in Automatic Fire-Extinguisher Systems, of which the following is a clear, full, and exact description.

My invention relates to automatic valves used in the dry-pipe system of fire extinguisher apparatus. There has been difficulty in making the valves used in these systems water-tight, and the valve seating means have not been made so that they would readily unlock and release the valve. In the systems where an explosive has been used to release the valve, the explosive substance has not been placed in a receptacle where it can be kept perfectly dry and so that it would retain its explosive quality.

The objects of my invention are to provide a valve which will avoid the above objections and embody many other advantages; and to provide means which will operate to release the interlocking devices holding the valve in place, regardless of atmospheric conditions or the time which may elapse before the system is called into operation.

For the accomplishment of these and other objects, the invention consists in the novel details of construction hereinafter particularly described, reference being had to the accompanying drawings forming a part hereof in which the same reference numerals designate like parts throughout the several views, and in which:—

Figure 1 is a vertical section of the automatic valve that normally closes the lateral service pipe, and the releasing means for said valve; Fig. 2 is an elevation of the valve and attached parts; Fig. 3 is a detail of a fusible plug.

Referring to the drawings, a nipple 2 adapted to be attached to a service pipe, is attached by means of flange 3 to the flange 4 of valve casing 5, suitable screws connecting the said flanges. The valve chamber inclosed by the valve casing 5 is nearly cylindrical in shape and is larger in diameter in its lower portion than the bore of the service pipes connected with it.

6 is a metal circular disk connected to valve stem 8, and normally rests on the annular valve seat 7 of tne casing and prevents the water from service pipe connected at 1 from entering into the pipe above the valve chamber. The base of the valve stem 6 is cone shaped and fits snugly into a cone shaped opening in the casing 5, when the valve is raised by the water, thus preventing the water from leaking out around the valve stem. Normally the valve disk 6 is held to the valve seat 7, by means of a curved arm 9 which presses on the upper end of said valve stem 8. Said curved arm 9 is pivoted on a lug formed on the upper part 11, at a point adjacent to where the valve stem 8 extends through the valve casing and slightly above the said stem when it rests normally on the valve seat. This arm 9 normally extends horizontally from the casing and at right angles to it. In said arm is a set screw 10 which can be screwed through the said arm and down on the head of the valve stem 8. This set screw when screwed down on said stem holds the valve 6 rigidly upon its seat so that water cannot escape around the valve. Normally the free end of the arm is engaged by notch 12 of lever 13. This lever 13 is elbow shaped, is hinged to the valve casing and is so formed that the distance from its end 14 to the notch 12 is much greater than from notch to the hinge end of the said arm. A hook 16 is pivoted on the nipple 17. The end 14 of the lever and the free end 15 of the hook are so formed that the hook will readily unlock from the said lever by which normally it is engaged when in normal position. Hook 16 is slightly curved and from the under side arm 18 extends downwardly. This arm at a point opposite the recess 20 is circular and to the under side of same is attached a circular piece of some non-conducting material, which fits snugly over the end of the plug or cartridge 21 in the mortar recess 20. As the cover 19 is raised by the explosion of the explosive material in said cartridge, the arm 18 is forced upward, the hook 15 unlocking from lever 13 and the arm 18 striking the latter forces it outward and the arm 9 is disengaged from notch 12, and the arm 9 is then forced upward by the water pressing against the valve disk 6.

At one point the valve casing has been thickened and tapped to admit plug 22 which when screwed out leaves the valve chamber exposed.

23 is a cartridge made of glass or other suitable material in the form of a capsule, through the cover of which fuses are extended and come into contact with the explosive placed into said cartridge. The cover 24 is fitted over the mouth of the said cartridge and is hermetically sealed. This cartridge is placed in a cover 21 of non-conducting material which in turn is placed into socket 20 on the nipple 17.

Having thus described my invention what I claim is:—

1. In an automatic fire extinguisher system, a valve casing having inlet and outlet openings and a passageway therethrough, a valve mounted in said casing and adapted to close said outlet opening and having a stem projecting through said casing, an arm pivoted on said casing and adapted to engage said valve stem, a lever pivoted on said casing and adapted to hold said arm in operative position, a socket in said casing, an explosive cartridge in said socket, fuses in contact with the explosive in said cartridge, a hook pivoted on said casing adapted to engage said lever, and to form a cover for said socket when the hook and lever are in operative position.

2. In an automatic fire extinguisher system, a valve casing having inlet and outlet openings and a passageway therethrough, a valve controlling said outlet opening, a stem on said valve projecting through said casing, an arm, pivoted on said casing, an adjusting screw in said arm adapted to engage said valve stem, a lever pivoted on said casing adapted to interlock with said arm, a socket in said casing, an explosive in said socket means in contact with the explosive for operating same, a hook pivoted to the casing and adapted to engage said lever when in operative position, a cup shaped member attached to said hook, and adapted to form a cover for said socket, an arm on said hook adapted to strike said lever when the explosive is ignited.

In testimony whereof, I have hereunto set my hand and seal this 13 day of October 1908.

TADIUS J. STANKIEWICZ. [L. S.]

Witnesses:
F. M. CHMIELEWICZ,
J. C. K. LINDHOUT.